(12) United States Patent
Kim et al.

(10) Patent No.: US 10,203,699 B1
(45) Date of Patent: Feb. 12, 2019

(54) SELECTIVE REMOTE CONTROL OF ADAS FUNCTIONALITY OF VEHICLE

(71) Applicant: TOYOTA JIDOSHA KABUSHIKI KAISHA, Toyota-shi, Aichi-ken (JP)

(72) Inventors: BaekGyu Kim, Cupertino, CA (US); Chung-Wei Lin, Sunnyvale, CA (US); Shinichi Shiraishi, San Jose, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/942,392

(22) Filed: Mar. 30, 2018

(51) Int. Cl.
| | |
|---|---|
| *G05D 1/02* | (2006.01) |
| *G05D 1/00* | (2006.01) |
| *G05G 1/01* | (2008.04) |
| *B60W 50/00* | (2006.01) |
| *G08G 1/01* | (2006.01) |

(52) U.S. Cl.
CPC ......... *G05D 1/0285* (2013.01); *G05D 1/0088* (2013.01); *G08G 1/0116* (2013.01); *B60W 2050/0095* (2013.01); *G05D 2201/0213* (2013.01)

(58) Field of Classification Search
CPC ............... G05D 1/0285; G05D 1/0088; G05D 2201/0213; G08G 1/0116; B60W 2050/0095
See application file for complete search history.

(56) References Cited

U.S. PATENT DOCUMENTS

| | | | |
|---|---|---|---|
| 7,031,826 B2 | 4/2006 | Flick | |
| 7,979,172 B2 | 7/2011 | Breed | |
| 9,794,552 B1 * | 10/2017 | Ribble | ................. H04N 17/002 |
| 2014/0309814 A1 | 10/2014 | Ricci et al. | |
| 2016/0272201 A1 * | 9/2016 | Kang | ....................... G05D 1/00 |
| 2018/0105182 A1 * | 4/2018 | Kim | ...................... B60W 50/00 |
| 2018/0127001 A1 * | 5/2018 | Ricci | .................. B60R 25/2018 |
| 2018/0186283 A1 * | 7/2018 | Fischer | .................... B60Q 1/46 |

FOREIGN PATENT DOCUMENTS

JP 2002163753 A 6/2002

OTHER PUBLICATIONS

Siemens, "Connected Vehicle Roadside Unit," brochure retrieved from https://w3.usa.siemens.com/mobility/us/en/road-solutions/.../RSU%20Brochure.pdf Feb. 25, 2018 (2 pages).

* cited by examiner

*Primary Examiner* — Russell Frejd
(74) *Attorney, Agent, or Firm* — Patent Law Works LLP

(57) ABSTRACT

An example method broadcasts a first message to a vehicle entering a coverage area of an access point proximate a roadway, and receives a response from the vehicle under local advanced drive assistance system (ADAS) control within the coverage area. The method determines, based on the ADAS capability of the vehicle, whether to assume a first remote ADAS control of the vehicle by a remote ADAS controller communicating with the vehicle via the access point. In response to determining to assume the first remote ADAS control, the method requests override permission for the first remote ADAS control from a local ADAS controller of the vehicle, receives an override confirmation from the local ADAS controller permitting the first remote ADAS control within the coverage area of the access point, and responsive to receive the override confirmation, provides a first remote ADAS control instruction to the local ADAS controller of the vehicle.

22 Claims, 8 Drawing Sheets

SELECTIVE REMOTE CONTROL OF ADAS FUNCTIONALITY OF VEHICLE

BACKGROUND

The present disclosure relates to vehicle systems. In a more particular example, the disclosure relates to technologies for selectively remotely controlling advanced driver-assistance vehicle systems.

Current vehicle-to-Infrastructure (V2I) technology can capture vehicle-generated traffic data and provide advisories to the vehicle regarding traffic and environment-related concerns. The United States Department of Transportation (USDOT) has launched various connected vehicle pilot projects in United States. These products use dedicated communication hardware called roadside units (RSUs), which enable V2I communication. In these projects, RSUs are installed in a proximity to roadways, such as freeways, highways, city streets, and/or intersections to communicate with vehicles. One example usage of the RSU is to monitor various situations in roadways based on footage captured by surveillance cameras or data communicated by vehicles passing through its coverage area. Based on the information, the RSU communicates applicable warning signals to vehicles to avoid or be aware of various hazards (e.g., accidents, approaching emergency vehicles, severe weather conditions, etc.). FIG. 7 depicts a map 700 of an example roadway 702 that includes a plurality of RSUs situated proximate the roadway 702 in which warning signals are provide to connected cars traversing the roadway 702.

SUMMARY

The subject matter described in this disclosure overcomes the deficiencies and limitations of the existing solutions by providing novel technology for localizing traffic situations.

According to one innovative aspect of the subject matter described in this disclosure, a computer-implemented method comprises: broadcasting a first message to a vehicle entering a coverage area of an access point proximate a roadway and receiving a response from the vehicle under local advanced drive assistance system (ADAS) control within the coverage area. The response reflects an ADAS capability of the vehicle. The method further comprises determining, based on the ADAS capability of the vehicle, whether to assume a first remote ADAS control of the vehicle by a remote ADAS controller communicating with the vehicle via the access point; in response to determining to assume the first remote ADAS control, requesting override permission for the first remote ADAS control from a local ADAS controller of the vehicle; receiving an override confirmation from the local ADAS controller permitting the first remote ADAS control within the coverage area of the access point; and responsive to receiving the override confirmation, providing a first remote ADAS control instruction to the local ADAS controller of the vehicle.

In general, another innovative aspect of the subject matter described in this disclosure may be embodied in computer-implemented methods comprising receiving, at a local ADAS controller of a vehicle, a first broadcast message from an access point proximate a roadway, the first broadcast message informing the vehicle that the vehicle is present in a coverage area of the access point; sending an ADAS profile of the vehicle to the access point, the ADAS profile specifying an ADAS capability of the vehicle; receiving, from the access point, an override request requesting a first remote ADAS control of the vehicle by a remote ADAS controller; providing, to the remote ADAS controller via the access point, an override confirmation providing permission to the remote ADAS controller to assume the first remote ADAS control of the vehicle; repeatedly, while the vehicle is located in the coverage area determining real-time vehicle information reflecting one or more dynamics of the vehicle, transmitting the real-time vehicle information to the access point for processing by the remote ADAS controller, receiving a remote ADAS control instruction for controlling the ADAS capability of the vehicle, and controlling the ADAS capability of the vehicle based on the remote ADAS control instruction.

These and other implementations may each optionally include one or more of the following features: repeatedly, while the vehicle is located in the coverage area: receiving real-time vehicle information reflecting one or more dynamics of the vehicle; evaluating the one or more dynamics of the vehicle relative to dynamic information of other vehicles in the coverage area to determine a subsequent remote ADAS control instruction for controlling the ADAS capability of the vehicle; and transmitting the subsequent remote ADAS control instruction via the access point to the vehicle for controlling the ADAS capability of the vehicle based on the subsequent remote ADAS control instruction; determining that the vehicle is leaving the coverage area; terminating the first remote ADAS control of the vehicle; broadcasting a second message to the vehicle entering a subsequent coverage area of a subsequent access point proximate the roadway; determining, based on one or more of the ADAS capability of the vehicle, computing resources of the subsequent access point, and a characteristic of a connection between the vehicle and the subsequent access point, not to assume remote ADAS control of the vehicle; that determining whether to assume the first remote ADAS control of the vehicle includes receiving from the local ADAS controller data specifying a local driving objective for driving the vehicle in the coverage area, determining a remote driving objective for the vehicle, and determining whether to assume the first remote ADAS control of the vehicle based on the local driving objective and the remote driving objective; that providing the first remote ADAS control instruction to the local ADAS controller of the vehicle includes receiving real-time vehicle information describing one or more dynamics of the vehicle from the local ADAS controller of the vehicle, and generating the first remote ADAS control instruction based on the one or more dynamics of the vehicle; that the real-time vehicle information describes the one or more dynamics of the vehicle includes one or more of a speed, a position, and a steering angle of the vehicle; receiving, from a vehicle management cloud service, updated map data for the coverage area of the access point, wherein the first remote ADAS control instruction is further generated based on the updated map data; that determining, based on the ADAS capability of the vehicle, whether to assume the first remote ADAS control of the vehicle by the remote ADAS controller communicating with the vehicle via the access point includes analyzing one or more signal characteristics of a data connection between the vehicle and the access point, determining that the data connection between the vehicle and the access points is sufficient for the first remote ADAS control of the vehicle, and determining to assume the first remote ADAS control based on the determining that the data connection between the vehicle and the access point is sufficient; that requesting the override permission for the first remote ADAS control from the local ADAS controller of the vehicle includes providing to the local ADAS controller a cost for the remote ADAS control;

that receiving the override confirmation from the local ADAS controller includes receiving an acceptance of the cost from the local ADAS controller; monitoring the presence of the vehicle in the coverage area of the access point as the vehicle drives through the coverage area; detecting that the vehicle is leaving the coverage area of the access point; and transferring control of the ADAS capability from the remote ADAS controller to the local ADAS controller.

Other implementations of one or more of these and other aspects include corresponding systems, apparatus, and computer programs, configured to perform the operations of methods, encoded on non-transitory computer storage devices.

The novel technology presented in this disclosure is particularly advantageous in a number of respects. For example, the technology described herein can send control signals from roadway communication infrastructure to the vehicles to selectively control and/or enhance ADAS functionality of vehicles. This selective control advantageously improve ADAS quality. The technology can also automatically evaluate the optimal conditions for controlling ADAS functionality remotely and automatically switch between local ADAS control and remote ADAS control based on the conditions and/or changes of those conditions.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

Figure 1:
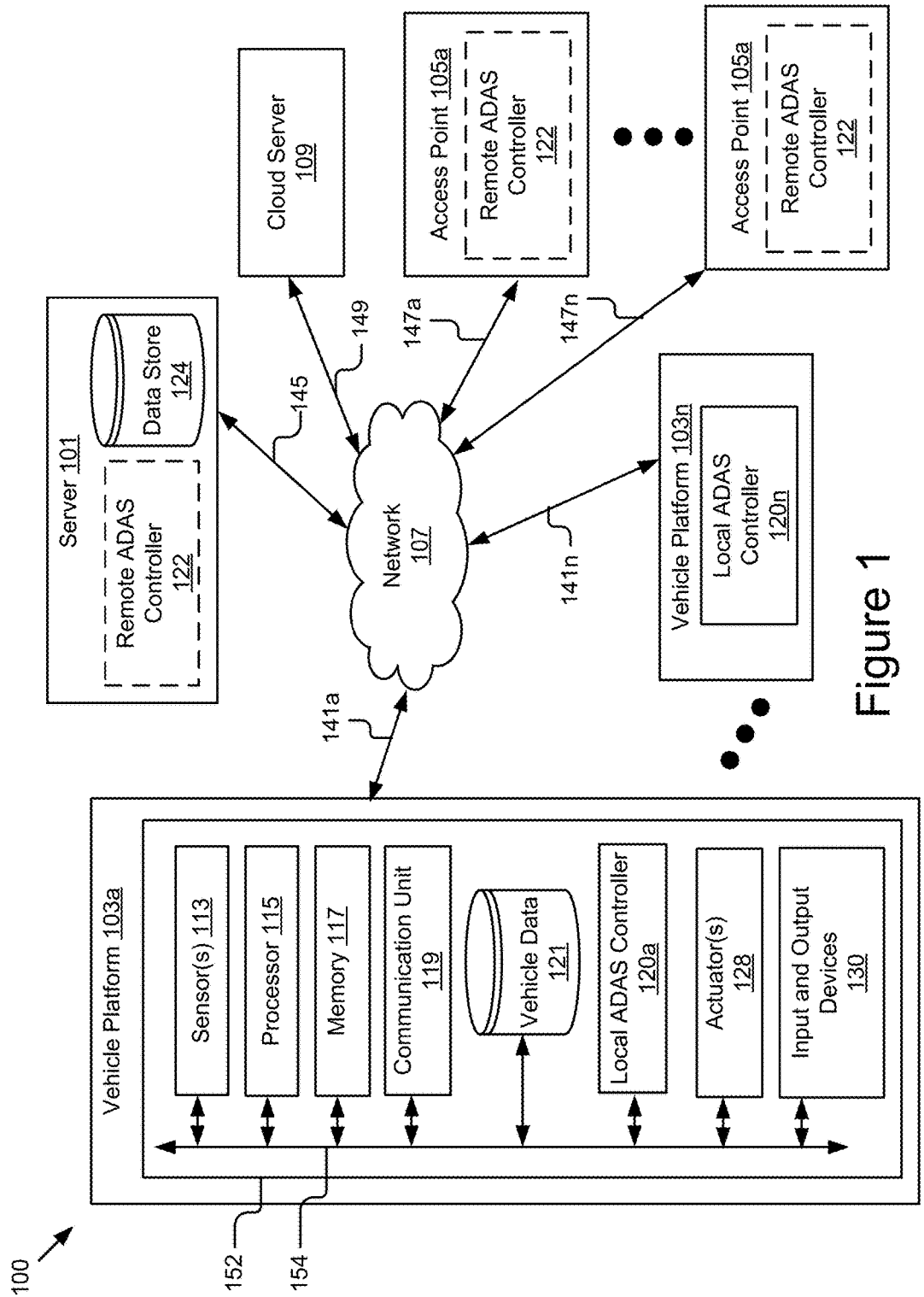
FIG. 1 is a block diagram of an example system for selectively remotely controlling ADAS(s).

Unlike many existing V2I communications systems that are limited to exchange warning signals with connected vehicles, the technology described herein, which includes various aspects including, but not limited to systems, methods, apparatuses, computer program products, etc., that can advantageously exchange control message to improve ADAS quality.

Modern vehicles are often equipped with various in-vehicle ADAS, which are onboard systems that assist the driver during the driving process, and often increase vehicle and road safety. Example ADAS include, but are not limited to, adaptive cruise control (ACC), glare-free high beam and pixel light, adaptive light control (e.g., swiveling curve lights), anti-lock braking system, automatic parking, automotive navigation system with typically GPS and TMC for providing up-to-date traffic information, automotive night vision, blind spot monitor, collision avoidance system (Pre-crash system), crosswind stabilization, cruise control, driver drowsiness detection, driver Monitoring System, electric vehicle warning sounds used in hybrids and plug-in electric vehicles, emergency driver assistant, forward collision warning, intersection assistant, hill descent control, intelligent speed adaptation or intelligent speed advice (ISA), lane keep assist system, lane departure warning system, lane change assistance, night vision, parking sensor, pedestrian protection system, inclement weather detection, surround view system, tire pressure monitoring, traffic sign recognition, turning assistant, vehicular communication systems, wrong-way driving warning, etc.

However, these in-vehicle ADAS are restricted to the localized sensing capability of the vehicle. For example, forward sensors, such as LIDAR, millimeter radar, cameras, etc., are typically used by ACC or pre-collision systems. However, these sensors are limited to monitor the area surrounding the vehicle, are unable to monitor an area beyond their detection range. Roadway communication infrastructure, such as RSUs, are also limited as they generally only monitor a coverage area for traffic situations, inclement weather, and such, using surveillance camera and weather data, and provide notifications of such to connected vehicles within range. This infrastructure often has little or no localized information about the vehicles its coverage areas, and without significant experimentation and/or reconfiguration, lack the requisite hardware and/or software that is capable of processing any such localized information in a meaningful way.

The novel technology described herein advantageously integrates remote roadway infrastructure and in-vehicle ADAS to selectively remotely control the in-vehicle ADAS systems during driving. These enhanced in-vehicle ADAS outperform traditional in-vehicle ADAS in many respects, including performing ADAS safety countermeasures more quickly. For instance, as discussed further herein, in some embodiments, the technology can selectively control the ADAS of a vehicle by a remote ADAS controller (e.g., hosted by proximate RSUs) and/or an in-vehicle ADAS controller. The technology can satisfy stringent resource and timing requirements, to allow a vehicle to be reliably controlled via roadway communication infrastructure, such as an RSU.

In some further embodiments, the technology can allow a vehicle to switch from an in-vehicle control to roadway communication infrastructure-based control or vice versa. The switch can be performed based on monitoring and control.

During monitoring, for instance, a vehicle may enter the coverage area of an RSU (e.g., is within range to communicate with a RSU within the coverage area), and the RSU may inform the vehicle of the availability of RSU. In response, the vehicle and the RSU may exchange information as to what ADAS features are currently being activated or are active on the vehicle and the additional improvement remote ADAS control can provide. Based on various criteria, which are discussed further herein, if it is determined that the RSU-based control will yield better performance, the vehicle controller and/or driver may be notified of such along with the cost of any such service if applicable.

During control, for instance, responsive to a vehicle controller determining to switch from the in-vehicle control to the RSU-based control, the vehicle and RSU exchange vehicle information and control commands via wireless communication (e.g., dedicated short-range communications (DSRC)). The RSU uses the vehicle information to remotely determine the ADAS commands and the vehicle processes and implements the commands. When certain termination conditions are met, such as the vehicle existing the coverage area of the RSU, the vehicle controller may assume sole control.

Further aspects of the technology are described with references to the figures. In particular, FIG. 1 is a block diagram of an example system 100 for selectively remotely controlling ADAS(s). As shown, the system 100 includes a server 101, one or more access points 105a . . . 105n, one or more cloud servers 109, and one or more vehicle platforms 103a . . . 103n coupled for electronic communication via a network 107. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, networks 107, or servers 101.

The network 107 may be a conventional type, wired and/or wireless, and may have numerous different configurations including a star configuration, token ring configuration, or other configurations. For example, the network 107 may include one or more local area networks (LAN), wide area networks (WAN) (e.g., the Internet), personal area networks (PAN), public networks, private networks, short and long rage wireless networks, virtual networks, virtual private networks, peer-to-peer networks, near field networks (e.g., Bluetooth®, NFC, etc.), vehicular networks, and/or other interconnected data paths across which multiple devices may communicate.

The network 107 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 107 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 107 that couples to the server 101 and the vehicle platform(s) 103, it should be understood that the network 107 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, actuator(s) 128, and an instance of a local ADAS controller 120 (e.g., 120a, 120n, etc.). Examples of computing device(s) 152 may include virtual or physical computer processors, control units, micro-controllers, etc., which are coupled to other components of the vehicle platform(s) 103, such as one or more sensors 113, actuators/motivators 128, etc. The vehicle platform(s) 103a . . . 103n may be coupled to the network 107 via signal lines 141a . . . 141n, and may send and receive data to and from other vehicle platform(s) 103, the access points 105, and/or the server(s) 101 and/or 109. The vehicle platform(s) 103 are capable of transporting from one point to another and traversing coverage areas of the access point(s) 105. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. The processor may comprise an electronic control unit (ECU) implemented in a vehicle platform 103 such as a car, although other types of platforms are also possible and contemplated. The ECUs may receive and store the sensor data as vehicle operation data in the vehicle data store 121 for access and/or retrieval by the local ADAS controller 120. In some implementations, the processor(s) 115 may be capable of generating and providing electronic display signals to input and/or output device(s) 130, supporting the display of images via the output device(s) 130, capturing and transmitting images, performing complex tasks including various types of object recognition and situation detection, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, the actuator(s) 129, the input and/or output device(s) 130, and/or and the vehicle data store 121.

The remote ADAS controller 122 is computer logic executable to provide remote ADAS control of vehicles within a coverage area. As illustrated in FIG. 1, the server 101 and/or the access point(s) 105 may include instances 122 of the remote ADAS controller 122. In some embodiments, each instance 122 may comprise one or more components of the remote ADAS controller 122 depicted in FIG. 2, and may be configured to fully or partially perform the functionalities described herein depending on where the instance resides. In some embodiments, the remote ADAS controller 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. The remote ADAS controller 122 may receive data from the vehicles 103, the cloud server 109, the server 101, and/or other network endpoints, and process it, and provide data back to these system entities.

The local ADAS controller 122 is computer logic executable to provide local ADAS control of vehicle. For example, the local ADAS controller 122 may receive data from one or more sensors 113 of the vehicle 103, receive data from the remote ADAS controller 122, switch between managing the local control of one or more ADAS(s) of the vehicle 103 two facilitating the remote control of the one or more ADAS(s) by the remote ADAS controller 122, abort the remote ADAS control by remote ADAS controller 122, augment parameters of the actuator(s) 128 of the vehicle 103 to adjust one or more dynamics of the vehicle number 103, etc.

One or more vehicles 103 may include an instance of the local ADAS controller 122. In some cases, some of the vehicle's 103 on a roadway may have the local ADAS controller functionality and some may not. In a familiar use case, a plurality of vehicles 103 within a coverage area contain instances of the local ADAS controller 120, such that the remote ADAS controller 122 for that coverage area can receive and correlate the dynamic data from each of these vehicles 103, and provide enhanced ADAS functionalities, as described further herein.

Figure 2:
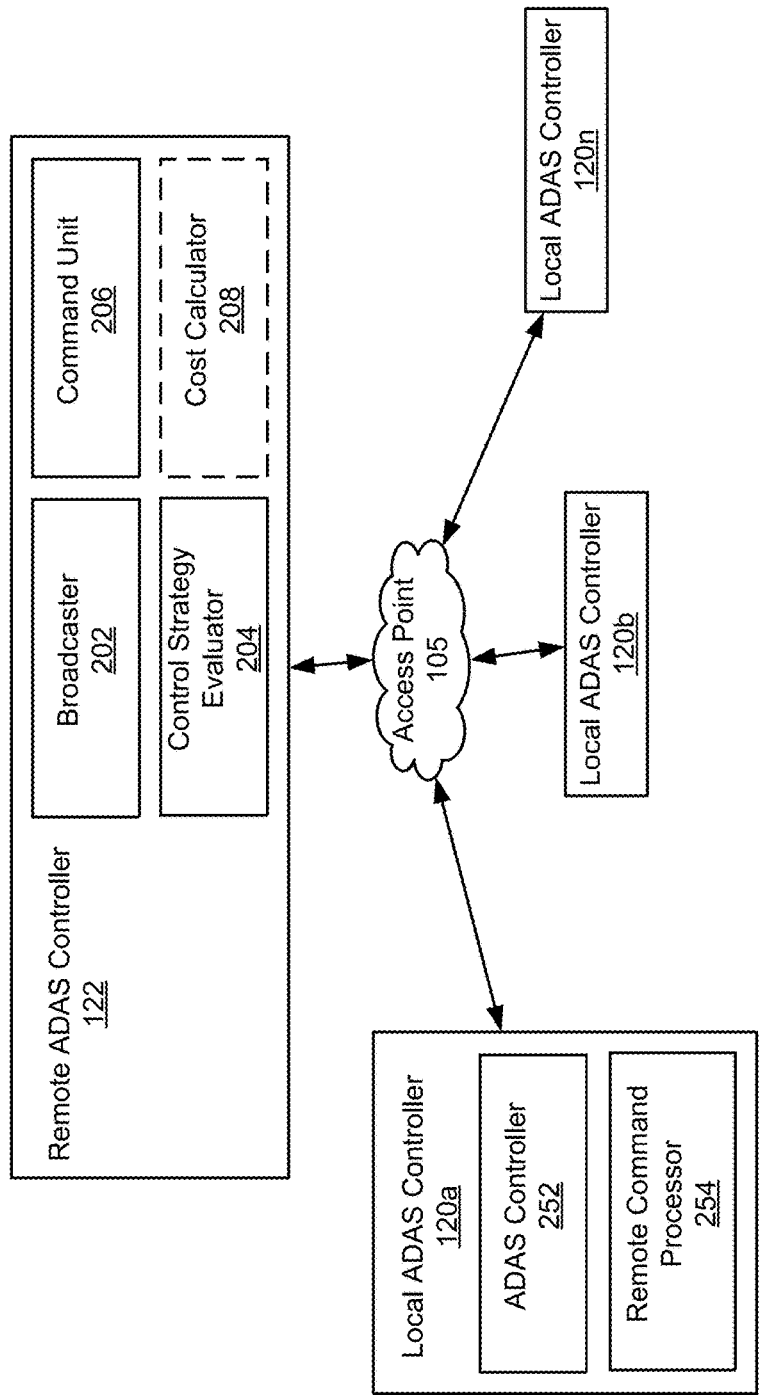
FIG. 2 is a block diagram of example remote and local ADAS controllers.

In some embodiments, each instance of the local ADAS controller 120 may comprise one or more components of the local ADAS controller 120 depicted in FIG. 2, and may be configured to fully or partially perform the functionalities described herein depending on where the instance resides. In some embodiments, the local ADAS controller 120 may be implemented using software executable by one or more processors of one or more computer devices, using hardware, such as but not limited to an FPGA, an ASIC, etc., and/or a combination of hardware and software, etc. The local ADAS controller 120 may receive data from the vehicles 103, the cloud server 109, the server 101, and/or other network endpoints, and process it, and provide data back to these system entities. The local ADAS controller 120 may be coupled to other components of the vehicle platform 103 via the bus 154, such as the sensor(s) 113, the memory 117, the communication unit 119, the processor 115, the vehicle data store 121, the actuator(s) 128, etc. The local ADAS controller 120 and the remote ADAS controller 122 are described in further detail below with reference to at least FIGS. 2-6.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the remote ADAS controller 122 and/or the navigation application 122. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 107) using wireless and/or wired connections. The communication unit 119 may include one or more wired interfaces and/or wireless transceivers for sending and receiving data. The communication unit 119 may couple to the network 107 and communicate with other computing nodes, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geolocation sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, static road objects (e.g., traffic cones, barricades, traffic signs, lanes, road markings, etc.), and/or dynamic road objects (e.g., surrounding vehicle platforms 103, road workers, construction vehicles, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different camera parameters and may be configured with different settings, installations, and/or configurations.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may also include road scene images captured by one or more image sensors 113 of the vehicle platform 103 and the image data associated with these images. In some embodiments, the image data may include an image timestamp indicating date and time when the image is captured, object categories of detected objects in the image, and/or types of traffic situation associated with the object categories, etc.

In some embodiments, the vehicle data may also include sensor configurations of the sensors 113. As an example, the sensor configurations associated with each image sensor 113 of the vehicle platform 103 may include extrinsic camera parameters and intrinsic camera parameters of the image sensor. In some embodiments, the extrinsic camera parameters may indicate the sensor position and sensor orientation of the image sensor in a world coordinate system (e.g., the GPS coordinate system). Non-limiting examples of the extrinsic camera parameters may include, but are not limited to, field of view (e.g., view angle), camera height (e.g., distance from the image sensor to the ground), etc. In some embodiments, the extrinsic camera parameters of the image sensor may be represented by a rotation matrix and a translation vector.

In some embodiments, the vehicle data store 121 may be part of a data storage system (e.g., a standard data or database management system) for storing and providing access to data. Other types of data stored in the vehicle data store 121 are also possible and contemplated.

The actuator(s) 128 include mechanical and/or electrical devices that are capable of producing or inhibiting motion. The actuator(s) 328 may be electric, pneumatic, hydraulic, magnetic, mechanical, thermodynamic, and/or magnetic, and/or a combination of the foregoing. Non-limiting example actuator(s) 328 include electric motors, motorized linkages, signaling components, servomechanisms, hydraulic cylinders, pneumatic actuators, corresponding gearing, connectors, and kinematic components, combustion engines, jet engines, etc. The actuators are be coupled to components via linkages, transmissions, drivelines, hydraulics, and/or other assemblies, such as those including wheels, props, turbo fans, blowers, jets, and/or other components, that are capable of accelerating, decelerating, and steering the vehicle.

The local ADAS controller 120 may output information via an output device 130 of the first vehicle platform 103 based on remote ADAS data received from a remote ADAS controller 122, for instance. For example, a vehicle platform may include output device(s) 130 coupled to the bus 154 which may comprise any devices configured to output or display information to a user or other devices, such as, but not limited to, a touch screen for displaying notifications, navigation information, multimedia information, settings, etc., an audio reproduction device (e.g., speaker) for delivering sound information, a display/monitor for presenting texting or graphical information to the user, etc. The outputting information may be text, graphic, tactile, audio, video, and other information that may be understood by the driver and/or passengers or the other devices, or may be data, logic, programming that can be readable by the operating system of the vehicle platform 103 and/or other computing devices. The output device(s) may be coupled to other components of the vehicle platform 103 directly or through intervening controllers. In some implementations, a set of output device(s) 130 may be included in or form a control panel that a person may interact with to adjust settings and/or control of a vehicle platform 103 (e.g., driver controls, infotainment controls, guidance controls, safety controls, etc.).

In some embodiments, the computing system 152 may execute a control or navigation application 122 that may receive the driver or passenger input and process it (e.g., interpret button press, voice command, etc.), and implement an action corresponding to the command, such as accept or reject a service fee for ADAS control, opt-in to remote ADAS control, select a navigation route, confirm an existence of a traffic situation, etc. For example, the navigation application 122 may present information about a traffic situation and/or other nearby or approaching situations. The output device(s) may be coupled to other components of the vehicle platform 103 directly or through intervening controllers. In some implementations, a set of output device(s) 130 may be included in or form a control panel that a person may interact with to adjust settings and/or control of a vehicle platform 103 (e.g., driver controls, infotainment controls, guidance controls, safety controls, ADAS settings and/or controls, etc.).

In some embodiments, the control or navigation application may perform path planning to determine or update navigation paths based on coverage areas of one or more access points 105, generate corresponding navigation instructions to adapt the navigation paths to the coverage areas such that remote ADAS control can be provided, and provide the instructions to the user via one or more output devices 130 of the vehicle platform 103 and receive input via one or more input device(s) 130 of the vehicle platform 103.

In association with the control or navigation application, the user may select a dedicated hardware button coupled to the bus 154 and/or a digital button presented on a touch-sensitive display (coupled to the bus 154) of the vehicle platform, or issue a voice command via a voice system (e.g., microphone, etc., coupled to the bus 154), etc. The vehicle platform 103 may include one or more input device(s) 130, which may comprise any standard devices configured to receive a variety of control inputs (e.g., gestures, voice controls) from a person or other devices. Non-limiting example input devices 130 may include a touch screen for inputting texting information, making selection, and interacting with the user 115; motion-detecting input devices; audio input devices; other touch-based input devices; keyboards; pointer devices; indicators; and/or any other inputting components for facilitating communication and/or interaction with a person or the other devices. The input device(s) 130 may be coupled to other components of the vehicle platform 103 either directly or through intervening controllers to relay inputs/signals received from people and/or sensor(s).

The servers 101 and 109 includes a hardware and/or virtual server that includes a processor, a memory, and network communication capabilities (e.g., a communication unit). The servers 101 and 109 may be communicatively coupled to the network 107, as reflected by signal lines 145 and 149, respectively. In some embodiments, the server(s) 101 and/or 109 may send and receive data to and from other entities of the system 100, e.g., one or more vehicle platforms 103, one or more access points 105, to one another, etc.

As depicted, the server 101 may include an instance of the remote ADAS controller 122. The server 101 may also include a data store 104 that stores various types of data for access and/or retrieval by these applications. For example, the data store 104 may store monitoring data received from traffic cameras, traffic sensors, signal infrastructure, mapping and navigation data received from vehicles and other servers, a dynamic map database that is updated frequently with information from vehicles and other endpoints to reflect a real-time or near real-time state of the roadways, weather data, etc. In some embodiments, the map database may include map data describing one or more geographic regions included in geographical maps. For example, the map data may divide a particular road into multiple geographic regions, each geographic region is corresponding to a predefined road segment of the particular road. In some embodiments, the localization data of a particular traffic situation may describe the coverage area representing that traffic situation (e.g., geolocation, geometric boundary (e.g., geometric shape, occupied lanes), related situation objects present in the traffic situation, etc.) at various points in time. The data stored in the data store 124 may be processed by a navigation and/or mapping application to produce dynamic map data to calculate navigation routes, traffic congestion estimates, and/or generate and provide alerts, updates, route recalculation, and/or other information with. This information may be provided by a cloud service hosted by the cloud server 109 and/or the server 101 to one or more access points 105 for use thereby when evaluating control strategies and/or assumption of remote ADAS control. The dynamic map data may reflect an up-to-date state of traffic situations along with the best information for traversing and/or circumventing the traffic situations.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIG. 2 is a block diagram of example remote and local ADAS controllers 120 and 122. As depicted, the remote ADAS controller 122 may include a broadcaster 202, a command unit 206, a control strategy evaluator 204, and a cost calculator 208, although it should be understood that the remote ADAS controller 122 may include additional components such as, but not limited to, a training engine, an encryption/decryption engine, etc., and/or these various components may be combined into a single entity or divided into additional entities. The local ADAS controller 120 may include an ADAS controller 252 and a remote command processor 254.

The various components 122, 202, 204, 206, 208, 120, 252, and/or 254, may be implemented as software, hardware, or a combination of the foregoing. The computer architecture of an access point 105 or server 101 or 109 may be similar to that of the vehicle, such that they include processor(s) 115, memor(ies) 117, communication unit(s) 119, input and/or output devices 130, etc., coupled via a communications bus like one with functionality similar to that of bus 154. As such, these component are abstracted from FIG. 2 so as on to obscure the other components depicted in this figure.

In some embodiments, the components 122, 202, 204, 206, 208, 120, 252, and/or 254 may be communicatively coupled by a communication bus and/or a processor to one another and/or the other components of the applicable underlying computing device or system (e.g., 103, 101, 109, 105, as the case may be). In some embodiments, one or more of the components 103, 202, 204, 206, 208, and/or 210 are sets of instructions executable by a processor to provide their functionality. In further embodiments, one or more of the components 122, 202, 204, 206, 208, 120, 252, and/or 254 are storable memory and are accessible and executable by a processor to provide their functionality. In any of the foregoing embodiments, these components 122, 202, 204, 206, 208, 120, 252, and/or 254 may be adapted for cooperation and communication with a processor and other computing components.

As shown in FIG. 2, the remote ADAS controller may communicate, via an access point 105, with one or more local ADAS controller 120 instances, and may simultaneously provide remote ADAS control instructions to these instances that are generated based on shared sensor information and roadway monitoring information. In some embodiments, the remote ADAS controller 122 may reside and operate on the access point 105, which may comprise a computing device that is mounted along a roadway to cover a particular segment of the roadway. In some embodiments, the remote ADAS controller 122 may reside and operate on a server (e.g., 101, 109, etc.) that is separate from the access point 105 but connected via a high-bandwidth connection via the network 107 to the access point 105 to provide sufficiently responsive remote ADAS control instructions. Other variations are also possible and contemplated.

The local ADAS controller 120 and the remote ADAS controller 122, and their constituent components are described in further detail below with reference to at least FIGS. 3-6.

Figure 3:
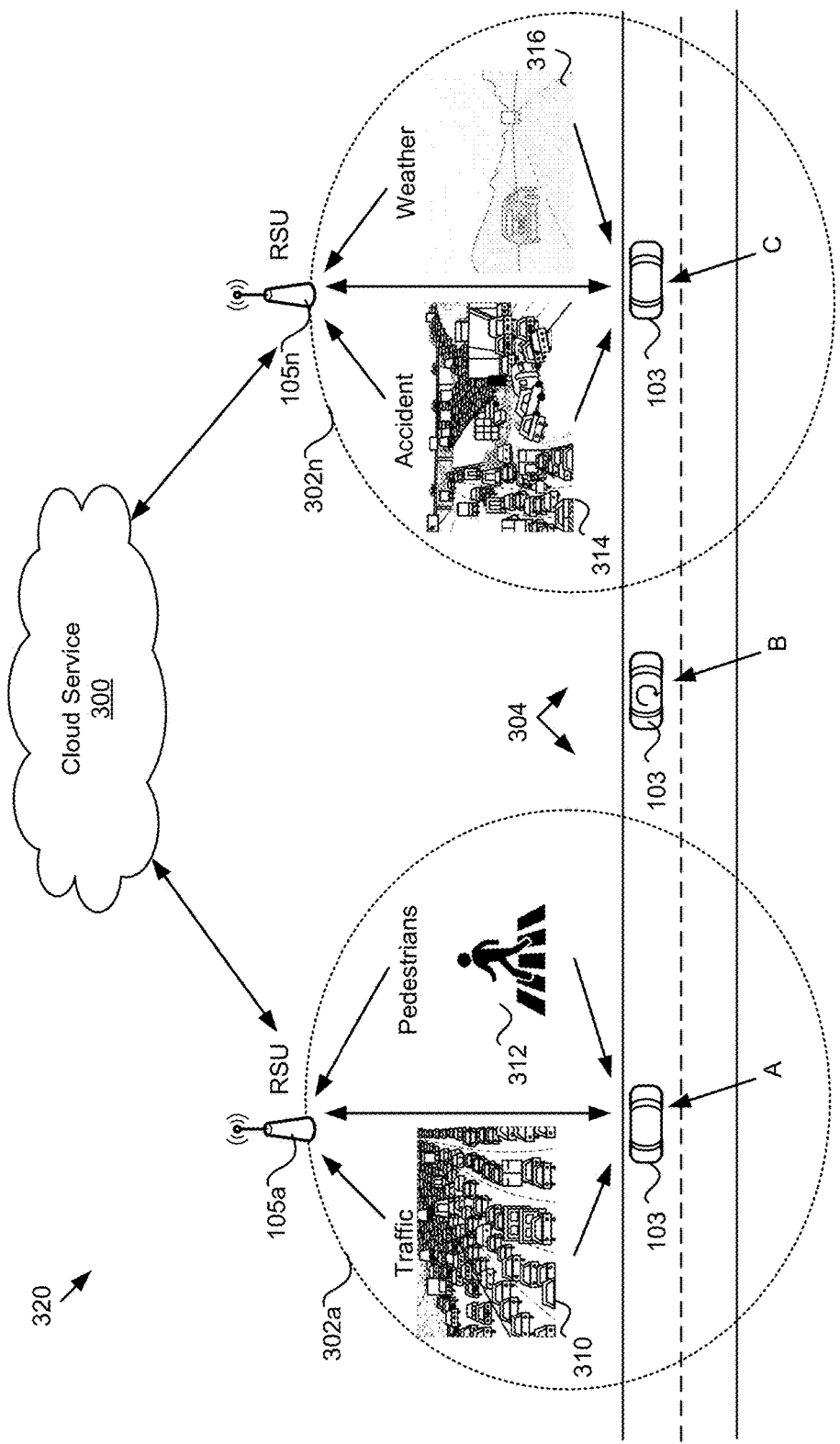
FIG. 3 is a diagram of the selective ADAS control of an example vehicle traveling through various coverage areas of roadway communication infrastructure.

FIG. 3 is a diagram of the selective ADAS control of an example vehicle 103 traveling through various coverage areas of roadway communication infrastructure 320. More particularly, the roadway communication infrastructure depicted in FIG. 3 may include a series of access points 105, such as RSU 105a and RSU 105n, which are situated long roadway 318. RSU 105a has a coverage area as shown by 302a, and RSU 105n has a coverage area as shown by 302n. In between coverage areas 302a and 302n is a dead zone 304. As the vehicle 103 travels on the roadway, it moves from position A to position B, and from position B to position C. In position A, the vehicle 103 is within range of the RSU 105a; in position B, the vehicle is out of range of both RSU 105a and RSU 105n; and in position C, the vehicle is within range of the RSU 105n.

By way of further example, RSUs 105a . . . 105n are installed at their designated road sites and are equipped with sensors to monitor various driving situation, such as traffic conditions, pedestrian presence on a crosswalk, accident scenes, weather conditions, and so on. The RSUs 105 are also able to communicate with cloud services via high-bandwidth wired communication. The cloud service(s) 300 may provide authentication data for authenticating vehicles 103 with the access points 105, dynamic map data reflecting a traffic state of the roadway, weather data reflecting current and/or approaching weather conditions, etc.

As the vehicle 103 enters coverage area 302a, and comes within range of the RSU 105a, a communication unit 119 begins receiving broadcast signals from the RSU 105a. The broadcast signals include coverage area entry information that informs the vehicle 103 that it is entered the coverage area of that RSU. The coverage area entry information may specify the identity of the RSU (e.g., a device identifier, a network address, unique identifier string, etc.), hardware information for the RSU (e.g., a device type, protocols supported by the device, the software version of the operating system of the device, etc., device interoperability requirements, etc.), specify the geographic boundaries of the RSU, specify the functional capabilities of the RSU (e.g., such as whether the RSU supports remote ADAS control), etc.

The local ADAS controller 120 of the vehicle 103 may receive the coverage area entry information, via the communication unit 119, and process it to understand that the vehicle is located within the RSU coverage area in that the RSU 105a supports the enhanced ADAS functionality described herein. Assuming that the vehicle 103 also supports the enhanced ADAS functionality and that the vehicle 103 has one or more ADAS activated, the local ADAS controller 120 sends the vehicle's ADAS profile to the RSU 105a, which evaluates it to determine whether to assume remote ADAS control of one or more ADAS of the vehicle 103.

The ADAS profile specifies the ADAS of the vehicle 103 and any RSU requirement(s). For example, the ADAS profile may indicate ADAS of the vehicle 103 are active, which ADAS support remote control, processing and/or communication requirements, RSU sensing or monitoring capability requirements, etc.

If the remote ADAS controller 122 determines to assume remote ADAS control, it requests permission to do so, which the local ADAS controller 120 may grant, and then assumes remote ADAS control of the vehicle 103 while the vehicle 103 is within the coverage area 302a and/or other conditions are met.

As the vehicle travels beyond the coverage area 302a and two position B, which is located in the dead zone 304, remote ADAS control is terminated and the local ADAS controller assumes local control of the one or more ADAS. However, as the vehicle 103 travels into the coverage area 302n of the RSU 105n, the local ADAS controller 120 of the vehicle 103 is again informed that it has entered the coverage area 302n based on the coverage area entry information broadcasted by the RSU 105n, in remote ADAS control of the one or more ADAS of the vehicle 103 may again be assumed by an instance of the remote ADAS controller 122 is associated with the RSU 105n, in a manner that is the same or similar to that discussed above and further below.

The following Table 1 illustrates example comparative properties of example local and remote ADAS control scenarios.

| Property | Local control | Remote control |
|---|---|---|
| Sensing area | Narrower (e.g., 10-100s of meters) | Broader (e.g., 10s-1000s of meters) |
| Amount of accessible information | Lower | Higher |
| Holistic view of roadway | No | Yes |
| Connectivity to cloud system | Lower bandwidth (e.g., via wireless) | Higher bandwidth (e.g., wired, fiber, etc. connection) |
| Connectivity with others necessary for control | No | Yes |
| Latency from sensing to control | Lower | Higher |
| Resource sharing with other vehicle(s) | No | Yes |

Regarding sensing area, local in-vehicle only ADAS control typically relies on local sensor(s) that have limited detection range(s) and/or capabilit(ies). An example local sensor range may cover 0-100s of meters. In addition, in some cases, obstacles within the detection range can obscure and/or occlude other obstacles behind them that are also within range that many local sensors are unable to reliably detect or detect at all. In some cases, this may be due to their installation position and/or limitations in the sensing technology.

On the other hand, remote ADAS control may comprise and/or receive data from sensors that can cover a larger area with multiple viewpoints that are less susceptible to being obscured. For example, in an RSU-based embodiment, depending on RSU type, some RSUs can be installed at a higher position so that their lines-of sight are typically wider, although the same considerations are applicable to other sensor types.

Regarding the amount of accessible information, local in-vehicle only ADAS control typically limited to using sensor information collected by local sensor(s) of the vehicle. In comparison, remote ADAS control can receive/access a more comprehensive data set that covers many other vehicles, traffic signals, cloud systems, and/or other entries.

Regarding a holistic view of a roadway, local in-vehicle only ADAS control generally processes its own state and its immediate surroundings, such as a localized traffic condition (e.g., it's heading, speed, braking, rate of acceleration/deceleration, etc.) and the vehicles immediate environment (e.g., presence of adjacent vehicles and objects, etc.). In contrast, remote ADAS control has access to vehicle sensor information from a plurality of vehicles within its coverage area and adjacent coverage areas, monitoring systems (e.g., traffic signal systems), cloud services (e.g., dynamic map services, authentication services, etc.), which provides the remote ADAS control a better understanding of what may be dynamically occurring along the roadway (e.g., a developing traffic situation) by monitoring a wider area, interacting with these other systems, evaluating different situations.

As a further example, as shown in FIG. 3, remote ADAS control of the vehicle 103 at position A in coverage area 302a may be based on dynamic traffic data provided by the cloud service 300 and crosswalk monitoring infrastructure (e.g., signaling hardware, etc.) that indicates whether or not pedestrians are crossing a particular roadway. This information may be considered with or without to the vehicle platform state data that is being received by the RSU 105a in various cases, when processing and generating remote ADAS control commands. In another example, as shown in FIG. 3, remote ADAS control of the vehicle 103 at position C in coverage area 302a may be based on dynamic traffic data reflecting an accident on the roadway, and in some cases the lanes that the accident is blocking, and weather data indicating that 2 inches of snow are recently fell and that temperatures are below freezing. This information may be considered with or without the vehicle platform state data that is being received by the RSU 105n in various cases, when processing and generating remote ADAS control commands.

Regarding latency as measured from the time of sensing to the time of ADAS control, in-vehicle only ADAS control typically has a lower than remote ADAS control because under in-vehicle ADAS control, and the components are located in closer proximity (e.g., a few meters) and generally connected via a high-speed communication bus. Additionally, the local ADAS control generally does not need to wait for input from via a wireless network from other remote endpoints. In contrast, the remote ADAS control is reliant on network communication with other network endpoints, and reliant on broader-distance monitoring technology that may require more time to capture and process data. This can sometimes result in remote ADAS commands being delayed. For instance, the connection between vehicles and an RSU may be degraded, which can result in dropped packets, slow transfer speeds, interference from other radio transmissions, and other issues that affects the speed in which control commands can be provided. Additionally, different vintages and models/makes of roadway infrastructure may have different levels of wireless communication performance, which can affect signal to control latency.

Regarding resource sharing with other vehicles, in-vehicle only ADAS control can benefit from not having to process information for other vehicles, entities, etc., and thus can preserve its resources (e.g., sensor(s), processor(s), memor(ies), etc.) for its own computations and is not required to share them with other vehicles. As a result, the in-vehicle control can be performed more deterministically compared to RSU-based control.

In contrast, remote ADAS control often processes requests and/or data received from multiple vehicles, monitoring systems, cloud services, data stores, etc., in order to accurately determine the holistic view of the roadway and relate it to the different vehicles in the coverage area, which results in a higher computational load, and at some peak times, possibly a lack of computing resources to process ADAS control commands with sufficient responsiveness. In effect, the remote ADAS control is capable of sharing the sensor(s) between the different vehicles (e.g., the viewpoints of the different vehicles as reflected by the sensor data from those vehicles can be correlated to provide a big picture), which is beneficial in providing more intelligent control of ADAS functionality.

However, this increased data processing can result in a significantly higher computation load for the computing system executing the remote ADAS controller 122 as it has to track the ADAS control strategies for the different vehicles and evaluate (e.g., process, correlate) the incoming data for the shared sensors and any monitoring or cloud services to maintain the remote ADAS controls for the different vehicles. On the other hand, because computation capacity is rapidly becoming cheaper and cheaper, and connectivity issues (e.g., lag, signal strength, interference, etc.) are lessening over time with improvements to wireless infrastructure, the practical technical impact of resource sharing may correspondingly lessen over time.

As shown in FIG. 3, RSU-based remote ADAS control is desirable in various cases because the RSUs 105a and 105n have additional context that the local ADAS control does not have, and as such, may determine better driving objectives than the local ADAS control can. Initially, the RSUs 105a and 105n may evaluate whether they have better capabilities in performing the given ADAS functionalities, as discussed elsewhere herein. In some embodiments, the RSUs 105a and 105n may determine their respective driving objectives based on the input data being received from other vehicles in the respective coverage areas 302a and 302n, monitoring data associated with the respective coverage areas 302a and 302n, and/or cloud service data being received for the respective coverage areas 302a and 302n.

For example, the RSU 105a's driving objective may be to maintain smooth traffic flow, which may require vehicle speed remain within a certain range. On the other hand, the driver's objective may be to speed ahead of other traffic. As these two objectives may conflict with one another, the RSU 105a may determine not to assume remote ADAS control as it may not be able to meet both objectives. On the other hand, the driver's object may be to travel at a consistent speed that flows with traffic, in which case the RSU 105a may determine to assume control. Each RSU 105 may one or many different objectives depending on its local situation, such as maintaining smooth traffic, avoiding an accident, using a particular lane, and so on.

Figure 4A:
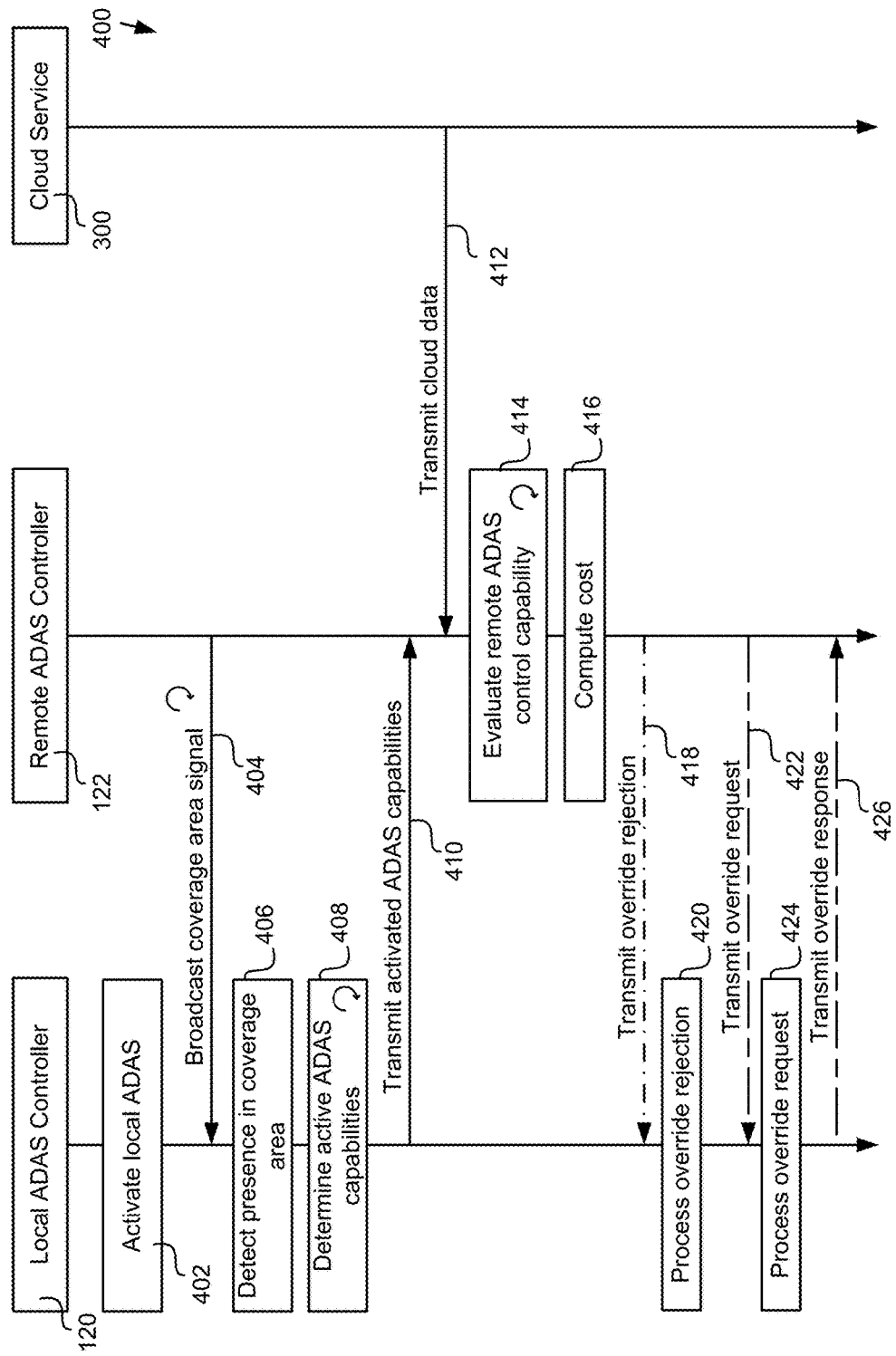
FIGS. 4A and 4B are flowcharts of an example method for selectively providing local or remote ADAS control of a vehicle.
Figure 4B:
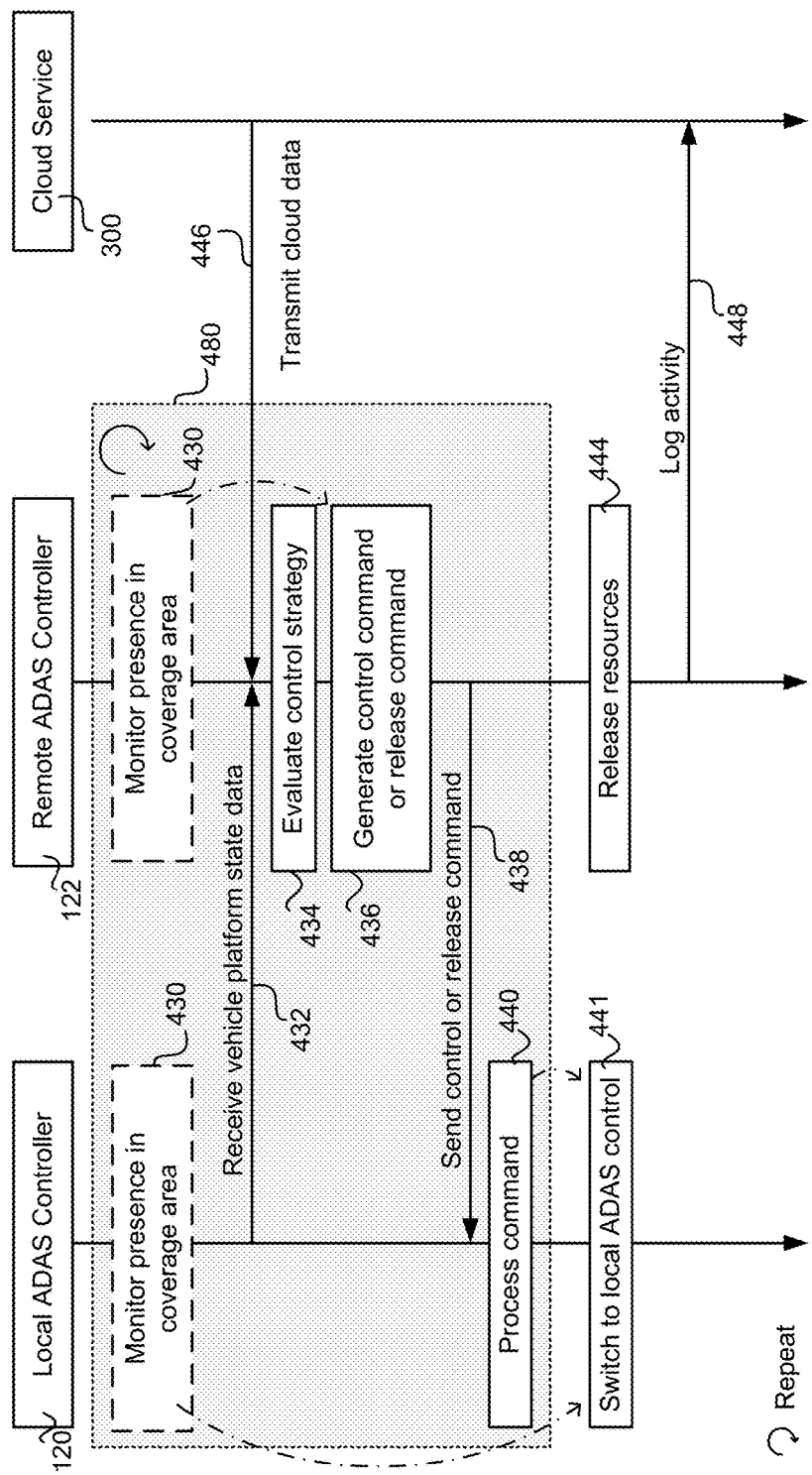

FIGS. 4A and 4B are flowcharts of an example method 400 for selectively providing local or remote ADAS control of a vehicle 103. In operation 402, the ADAS controller 252 activates the local ADAS control of one or more ADASs of the vehicle 103.

In operation 404, the broadcaster 204 of the remote ADAS controller 122 broadcasts a coverage area signal from an access point 105 for a coverage area of a roadway. In some embodiments, the broadcaster 204 may broadcast a message to the vehicle 103 as it enters a coverage area of the access point 105, which may be situated proximate the roadway. The local ADAS controller 122 of a vehicle 103 may receive the broadcast message from the access point proximate the roadway. The broadcast message may inform the ADAS controller 252 of the vehicle 103 that the vehicle 103 is present in a coverage area of the access point.

In some embodiments, the access point 105 may comprise an RSU mounted on a platform, such as a tower, building, natural formation (e.g., a cliff), etc., along a particular segment of the roadway and configured to provide coverage for that roadway segment, although other types of wireless computing systems are also possible and contemplated, such as any wireless computing system capable of broadcasting a signal for a coverage area of a roadway and receiving responses from the vehicles traveling along the roadway. Further examples may be satellite-based, airborne (e.g., incorporated into a blimp, drone, etc.), or of any other suitable form-factor and configuration.

In operation 406, the ADAS controller 252 of the local ADAS controller 120 may detect its presence in the coverage area by processing the coverage area signal. The coverage area signal may include data identifying the access point and/or the remote ADAS controller 122 associated with the access point. For example, the access point and/or the remote ADAS controller 122 may be identified using unique identifiers. The unique identifiers referenced herein may comprise any unique combination of data to identify an entity, such as a string of symbols (e.g., letters and numbers, etc.), an authentication token, etc.

In some embodiments, the access point 105 may persistently (e.g., continuously, repeatedly, iteratively, etc.) broadcast the coverage area signal so that local ADAS controllers 120 of the vehicles 103 located within the coverage area can reliably determine whether they are within range, so that new vehicles 103 entering the coverage area can quickly determine such and engage with the remote ADAS controller 122.

In some embodiments, the broadcast coverage area signal may indicate the capabilities of the remote ADAS controller 122, such as what ADAS features the remote ADAS controller 122 is capable of remotely controlling. In some embodiments, the broadcast coverage area signal may reflect the wireless signal boundaries covered by or supported the access point 105 associated with the remote ADAS controller 122, may include geographic coordinates associated with the remote ADAS controller 122, and/or any other suitable information associated with a coverage area of the remote ADAS controller 122.

In operation 408, the ADAS controller 252 determines the active ADAS capabilities of the vehicle 103. In some embodiments, state information for each ADAS of the vehicle 103 may be stored in the vehicle data 121, such as in a lookup table, a flat file, a database, etc., stored in non-transitory storage of the vehicle platform 103, such as but not limited to the memory 117. In some embodiments, state information for each ADAS may be stored in active memory of the vehicle platform 103, such as the memory 117, a may be updated when the state of a given ADAS changes from active to inactive or vice versa (e.g., enabled to disabled or vice versa, etc.). Other variations are also possible and contemplated.

The ADAS controller 252 may query the vehicle data 121 for a list of one or more ADASs supported by the vehicle and generate an ADAS profile based on the queried data. The ADAS profile may specified the activated ADAS capabilit(ies) of the vehicle 103.

In some embodiments, the ADAS controller 252 may continuously monitor any changes in states of the various ADASs of the vehicle. Then, if the remote ADAS controller 122 has assumed remote ADAS control of a given ADAS of the vehicle 103, and the ADAS controller 252 of the local ADAS controller 120 can detect that the given ADAS has been deactivated, the ADAS controller 120 may transmit an updated ADAS profile that reflects the deactivation of that ADAS. In response, the remote ADAS controller 122 can cease provision of ADAS control commands for that ADAS to the vehicle. Similarly, if a previously inactivated ADAS becomes activated, the ADAS controller 252 can detect the activation of the ADAS and provide an updated ADAS profile indicating the ADAS has been activated for evaluation by the remote ADAS controller 122.

In operation 410, the ADAS controller 252 may send the ADAS profile of the vehicle 103 to the access point 105. The ADAS profile may specify one or more ADAS capabilities of the vehicle. The access point 105 may receive ADAS capability data (e.g., the ADAS profile) from the vehicle 103, which is under local ADAS control within the coverage area, that specifies the one or more activated ADAS capabilities of the vehicle. In some embodiments, the ADAS controller 252 may transmit this data as a response to the broadcast coverage area signal received from the remote ADAS controller in operation 404, and/or responsive to authentication exchange between the local ADAS controller 120 and the remote ADAS controller 122 that authenticates the vehicle 103 with the access point 105 and vice versa, to ensure the integrity and security of the handoff of any ADAS control.

The vehicle 103 may authenticate with the access point 105 using any suitable secure, encrypted authentication protocol (e.g., such as one using public and private digital keys, multi-factor authentication, etc.). For instance, suitable security mechanisms that provide message authentication and message encryption for privacy reasons in some cases may be used. Message authentication helps to ensure the all messages are sent by legitimate senders, and may be built on baseline communication protocols. For example, DSRC can provide digital signatures based on Elliptic Curve Digital Signature Algorithm (ECDSA) so that a receiver can verify the identity of the corresponding senders. Regarding the security key management (which is often used by available security mechanisms including ECDSA), a public key infrastructure (PKI) or a security certificate management system (SCMS) may be used and provided by, linked with the cloud service (e.g., provided by the server 101, the cloud server 109, etc.). In some embodiments, when a vehicle 103 or an access point 105 senses any suspicious behavior of another vehicle 103, it can report the suspicious behavior to other access points 105 and the cloud service, which can accumulate the information for more accurate detection and react if necessary.

In operation 412, one or more cloud services 300 may provide cloud data, which may comprise global ADAS context data that may be processed by the remote ADAS controller 122 to evaluate the efficacy of assuming remote ADAS control and/or the cost of assuming remote ADAS control.

In operation 414, the control evaluator 208 of the remote ADAS controller 122 evaluates the remote ADAS control capability of the remote ADAS controller 122. In some embodiments, the control evaluator 208 may determine, based on the ADAS capability of the vehicle as reflected by the ADAS profile, whether to assume remote ADAS control of the vehicle. In some embodiments, the determination of whether to assume control may be based on one or more of computing resources of the computing system executing the remote ADAS controller 122, such as the computing resources of the access point 105, one or more characteristics of the data connection between the vehicle 103 and the access point 105, and/or the ADAS capabilit(ies) of the vehicle 103.

For instance, the remote ADAS controller 122 that is communicating with a given vehicle 103 via the access point 105 may analyze one or more signal characteristics of a data connection between the vehicle 103 and the access point 105, determine that the data connection between the vehicle 103 and the access points 105 is sufficient (e.g., can handle the load and has sufficiently low latency) to remotely control the ADAS of the vehicle, and may determine to assume the first remote ADAS control based on the determining that the data connection between the vehicle and the access point is sufficient.

In some embodiments, the ADAS functionality of the vehicle 103 may be under remote control in the first coverage area, but as the vehicle 103 leaves that coverage area enters a subsequent coverage area, the remote ADAS controller 122 associated with that subsequent coverage area may determine not to assume remote ADAS control vehicle, for instance, based on one or more of the foregoing factors. For instance, the access point 105 may broadcast a message to the vehicle 103 entering the subsequent coverage area, and the remote ADAS controller 122 of that access point 105 may determine based on one or more of the ADAS capability of the vehicle, computing resources of the subsequent access point 105, and a characteristic of a connection between the vehicle and the subsequent access point, not to assume remote ADAS control of the vehicle.

In some embodiments, remote ADAS control may be declined because the access point 105 may not be equipped with appropriate sensors that are need to support certain ADAS features, or an access point 105 may be at or over capacity (e.g., an RSU may be allocated to support other vehicles in a way that no more control messages can be sent to new vehicles guaranteeing necessary requirements for ADAS features of those new vehicles 103.

In response to determining not to assume remote ADAS control of the ADAS(s) of the vehicle 103, the ADAS command unit 206 may transmit an override rejection 418 to the local ADAS controller 120, which may process the rejection in block 420 and continue location control of the ADAS(s) of the vehicle 103.

In response to determining to assume remote ADAS control of the ADAS(s) of the vehicle 103, the ADAS command unit 206 requests override permission for the remote ADAS control from the local ADAS controller 120 of the vehicle 103. In some embodiments, to request permission, the ADAS command unit 206 transmits, in operation 422, an override request 422 to the remote command processor 254 of the local ADAS controller 252. The remote command processor 254 of the local ADAS controller receives, from the access point, the override request requesting remote ADAS control of the vehicle by the remote ADAS controller 122 and processes the override request to determine whether to authorize the override.

In operation 426, responsive to determining to grant the override request, the remote command processor 254 provides, to the remote ADAS controller via the access point, an override confirmation providing permission to the remote ADAS controller to assume the first remote ADAS control of the vehicle. The command unit 206 of the remote ADAS controller 122 receives the override confirmation from the local ADAS controller permitting remote ADAS control within the coverage area of the access point and, in response, proceeds to provide remote ADAS control instructions to the local ADAS controller 120 of the vehicle 103 based on vehicle platform state data received from the vehicle 103.

In some embodiments, the request for override permission is based on the cost of providing the remote ADAS control as a service. For example, an owner of the infrastructure that provides for communication between roadway infrastructure and vehicles that pass by may charge a fee for providing the enhanced ADAS control. In some embodiments, a driver of the vehicle may be notified via a display of the vehicle or another output device that it has entered a coverage area that supports remote ADAS control and may request the user opt in by issuing a confirmatory command, such as pressing a button, tapping a non-screen notification, issuing a voice command that is captured by hands-free system of the vehicle, etc.

In some embodiments, the remote ADAS controller 122 may compute the cost of providing the remote ADAS control service, in operation 416. For example, when providing the override request in operation 422, the remote ADAS controller 122 may provide to the local ADAS controller 120 a cost for the remote ADAS control. The local ADAS controller 120 may inform the driver of the costs and request feedback from the driver via an input device 130 of the vehicle 103, or may query a driver setting stored in the memory 117 and/or the vehicle data 122 that specifies whether to automatically accept the cost of remote ADAS control. Based on the input from the driver and/or result of the query, the local ADAS controller 120 may determine whether or not to accept the cost of the remote ADAS control. In the override response in operation 426, the override confirmation provided by the local ADAS controller 120 may reflect whether or not the cost of the remote ADAS control is been accepted (e.g., if it has, then the override response consents to the remote control, if it has not, then the override response does not consent to the remote control). The remote ADAS controller 122, when receiving the override confirmation in operation 426, also receives an acceptance or denial of the cost of the remote ADAS control. If the cost is accepted, the remote ADAS controller 122 will proceed to provide the remote ADAS control service.

FIG. 4B in particular is a flowchart of the feedback-based remote ADAS control provided by the remote ADAS controller and the process for switching back to local ADAS control. The operations in section 480 represent a feedback control loop between the remote ADAS controller 122 and the local ADAS controller 120 that provides the command unit 206 of the remote ADAS controller 122 the requisite information needed to evaluate the control strategy and generate the control command or release the override.

For instance, repeatedly, while the vehicle is located in the coverage area, the remote ADAS controller 122 receives real-time vehicle information reflecting one or more dynamics of the vehicle, evaluates the dynamic(s) of the vehicle relative to other inputs, and based thereon, generates and provides subsequent ADAS control instructions for controlling the ADAS(s) that are under remote control. Correspondingly, the local ADAS controller 120 repeatedly determines real-time vehicle information reflecting one or more dynamics of the vehicle, transmits the real-time vehicle information to the access point for processing by the remote ADAS controller 122, receives the next remote ADAS control instruction for controlling the ADAS capability of the vehicle, and controls the ADAS capability of the vehicle based on the remote ADAS control instruction.

More particularly, in operation 432, the control strategy evaluator 204 receives vehicle platform state data. The vehicle platform state data may include real-time vehicle information reflecting one or more dynamics of the vehicle. Example vehicle dynamics may include a speed, a position, a rate of change of the vehicle (e.g., acceleration, deceleration, etc.), a steering angle of the vehicle, the locations of any external objects relative to the vehicle (e.g., other cars, static roadway objects, etc.), the geographic location of the vehicle (e.g., GPS coordinates), and/or any other suitable dynamic vehicle information that can be used to determine the location and/or operative state of the vehicle by the remote ADAS controller 122.

The local ADAS controller 120 may retrieve and provide the data transmitted as vehicle platform state data from the vehicle data store 131 (e.g., a database, a look-up-table, etc.), the memory 117 of the vehicle 103, an ECU of the vehicle 103, one or more sensors 113 of the vehicle 103, etc.

In operation 446, the control strategy evaluator 204 may receive cloud data transmitted by a cloud service 300. The cloud service 300 may represent a vehicle management cloud service that tracks the locations and provides navigational instructions and map data to a multiplicity of vehicles along the roadways various different jurisdictions. The cloud data may include updated, dynamic map data for the coverage area of the access point associated with the remote ADAS controller 122.

The control strategy evaluator 204 in operation 434 evaluates the control strategy using the vehicle platform state data relative to other input, such as dynamic information from the cloud service 300 and/or dynamic information of other vehicles in the coverage area. The control strategy evaluator 204 may use determine the next (a subsequent) remote ADAS control instruction (also called command) for controlling the ADAS capability of the vehicle using this information.

In some embodiments, the control strategy evaluator 204 may process the dynamic map data to verify monitoring data received from sensors coupled to the access point 105 and/or provided to the access point 105 by other roadway infrastructure. Further, the remote ADAS controller 122 may process the dynamic map data to determine which areas may be experiencing congestion, accidents, fast traffic flows, etc., and may use the identified areas to generate remote ADAS control instructions for vehicles 103 travel interest areas, such that the congested areas and or areas with accidents can be navigated safely and efficiently, a providing any responders on the scene sufficient room to address the congestion and/or accidents. In some embodiments, the dynamic map data may be used to determine optimal speeds for the cruise control systems of the vehicles, determine optimal lanes for automatic lane change systems, determine optimal gaps for spacing vehicles to improve traffic flows, etc.

In some embodiments, the control strategy evaluator 204 may determine a local driving objective of the vehicle 103*a* based on the vehicle platform state data. For example, if the vehicle platform state and reflects that a turning indicator of the vehicle is on, the steering angle of the vehicle reflects the vehicle is changing from a right to the left lane, and that the vehicle is accelerating, and other vehicle platform state data from another vehicle 103b reflects that that vehicle is located in front of vehicle 103a, the control strategy evaluator 204 may determine that the local driving objective of the vehicle 103a is to pass the vehicle 103b.

The control strategy evaluator 204 may compare the local driving objective of the vehicle to a remote driving objective, such as a global objective for the coverage area or portions of the coverage area. For instance, the global objective may be to optimize traffic flows through the area by equalizing the travel speeds of the vehicles 103 in that area. Based on the comparison of the objective, the command unit 206 may determine not to set the cruise control of the vehicle 103a to a speed that would optimize the traffic flow as it would conflict with the local objective. Instead, the control strategy evaluator 204 may wait until the next cycle when vehicle platform state data reflects the speed of the vehicle 103a has settled, the vehicle is now traveling in a more constant rate of speed and not changing lanes, and the driver has reset the cruise control. At that point, the remote ADAS controller 122 may optimize the speed at which the schedule is set to provide for optimal spacing between the vehicles in the coverage area in an effort to accomplish the global objective.

As such, the control strategy evaluator 204 may determine a remote driving objective for a vehicle that qualifies for remote ADAS control, and determine whether to assume remote ADAS control of the vehicle based on the local driving objective and the remote driving objective. In some embodiments, the local driving objective may be specified in the vehicle platform state data or inferred from the vehicle platform state data and/or other data.

In operation 436, the command unit 206 may generate a remote ADAS control instruction, such as a control command or a release command, depending on the outcome of the evaluation in block 434. The remote ADAS control instruction may include data specifying ADAS functions that should be adjusted and/or not adjusted, and may provide ADAS parameters for adapting the ADAS functions that should be adjusted. The release command may specify a reason for the release, such as a departure of the vehicle from the coverage area, a weakening of the signal between the vehicle 103 and the access point 105, a determination that reliable remote ADAS control cannot be provided for other reasons, etc.

In operation 438, the command unit 206 may transmit the next remote ADAS control instruction via the access point to the vehicle for controlling the ADAS capability of the vehicle based on the subsequent remote ADAS control instruction. In some embodiments, the instruction provided in operation 438 may comprise a control command that instructs ADAS controller 252 of the local ADAS controller 120 to control the corresponding ADAS in a particular way. In some embodiments, the instruction provided in operation 438 may comprise a release command that instructs the local ADAS controller 120, and more particularly the ADAS controller 252 of the vehicle 103 to resume local control of the ADAS that is under remote control.

In operation 440, the ADAS controller 252 processes the instruction received in operation 438. If the instruction is a control instruction/command, the ADAS controller 252 will interpret the instruction, translate the instruction into signals that are processed by the processor 115 (e.g., an engine control unit), which is configured to controlling the actuator(s) 128 of a vehicle platform 103. For example, the ADAS controller 252 send signals (e.g., ADAS settings, calibration commands, etc.) to the processor 115, which processes them to control the movement or state of the vehicle 103, including the direction and speed of the vehicle 103 itself and/or its appendages and components.

In some embodiments, the local ADAS controller 120 may utilize the remote ADAS control instructions in conjunction with local settings and/or sensor data to enhance the ADAS(s) under control, may emulate a control by wire scenario in which the local ADAS controller 120 is overridden by the instructions of the remote a desk controller 122, etc.

In some embodiments, the monitoring of the presence of the vehicle 103 is done in association with the feedback operations 432, 424, 436, 438, and 440. For example, the control strategy evaluator may monitoring the presence of the vehicle in the coverage area of the access point as the vehicle drives through the coverage area based on the vehicle platform state data being iteratively received. The control strategy evaluator 204 may detect, based on the vehicle platform state data, the vehicle is leaving the coverage area of the access point, and responsive to such a determination, may transfer control of the ADAS capability from the remote ADAS controller to the local ADAS controller, as reflected in block 441.

In some embodiments, the local ADAS controller 120 may determine that it is leaving the coverage area of an access point and may terminate the remote ADAS control locally and switch control back to ADAS control as reflected in block 441.

In some embodiments, monitoring of the presence of the vehicle 103 is done in parallel with the feedback loop. For instance, in operation 430, the ADAS controller 252, and/or the command unit 206 monitors the presence of the vehicle 103 within the coverage area. For example, if either the local ADAS controller 120 or the remote ADAS controller 122 detects that the vehicle is leaving or has left the coverage area, control of the ADAS(s) of the vehicle is handed over to the local ADAS controller 120. In particular, if the command unit 206 determines that the vehicle is leaving/has left the coverage area, the command unit 206 may advance to operation 436 and generate a release command, which is sent to the local ADAS controller 120 in operation 438, and processed by the remote command processor 254. The remote command processor 254 may process the release command, which includes data instructing the local ADAS controller 120 to take control of the ADAS from the remote ADAS controller 122, and the remote command processor 254 signals the ADAS controller 252 to switch to local ADAS controller, which it proceeds to do in operation 441.

In block 448, the remote ADAS controller 122 of the access point 105 may log the remote ADAS control activity with the cloud service 300. In future transmissions of cloud data from the cloud service, aspects of the activity data may be transferred to the relevant access point 105 and processed by the remote ADAS controller 122 associated with that access point 105 to enhance the remote ADAS control services provided by it. For example, the cloud service 300 may machine learn certain preferences, traffic control optimizations, remote ADAS control optimizations, and/or other suitable information for provision to the remote ADAS controller instances 122 in service.

A further non-limiting example of switching modes from the in-vehicle control to the remote (e.g., RSU)-based control is now provided in reference to FIGS. 4A and 4B. Once it is decided to transfer the control to the remote ADAS controller 122, during the feedback control phase, since it was determined that the data connection between the vehicle 103 and the remote ADAS controller 122 is sufficient, the remote ADAS controller 122 exchanges data with vehicle with low enough latency and high enough throughput to control the vehicle in real time. The vehicle 103 repeats sending its current dynamic state, such as its vehicle position (e.g., GPS coordinates), speed, rate of change, steering angle, etc., to the remote ADAS controller 122, which processes it and sends a new control parameter to the vehicle 103 so that the vehicle 103 can adjust its actuator input. Since, in some embodiments, the remote ADAS control is only effective while the vehicle is driving within its coverage area, when the vehicle is about to exit the area, the RSU informs the vehicle of the exit so that the vehicle can switch from the RSU-based control to in-vehicle control.

In further embodiments, the instance of the remote ADAS controller 122 may handoff remote control to a geographically adjacent instance of the remote ADAS controller 122 for seamless continuance of the remote ADAS control. In these further embodiments, the coverage areas of the two instances of the remote ADAS controller 122 overlap or are sufficiently adjacently situated so that the connectivity hop between access points 105 is seamless and does not introduce prohibitive communication lag or throughput issues.

In embodiments where remote ADAS control is being discontinued, the access point 105 can release the resources it reserved for the vehicle 103 so that it can serve other vehicles.

Figure 5:
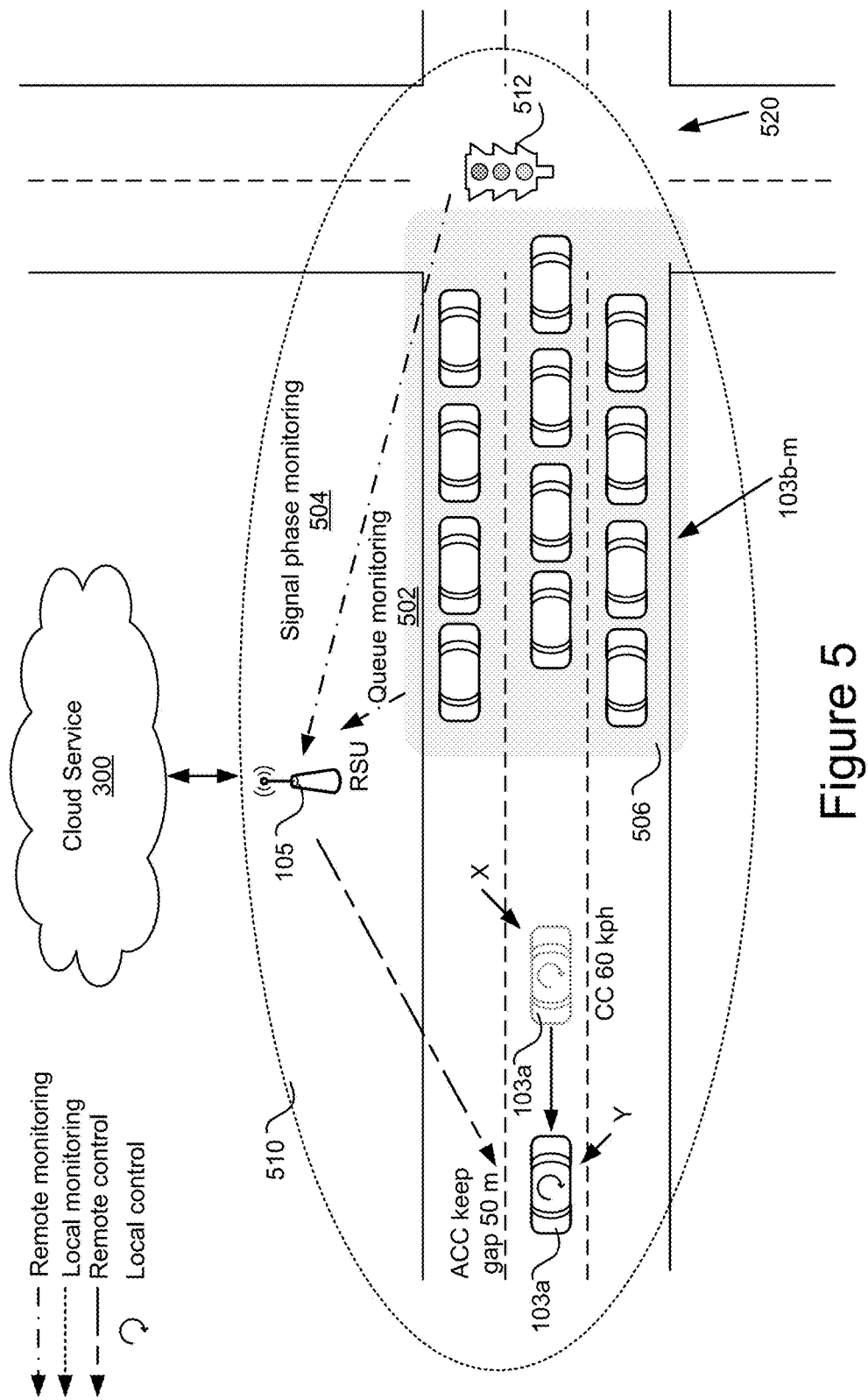
FIGS. 5 and 6 are diagrams illustrating example selective ADAS control scenarios.
Figure 6:
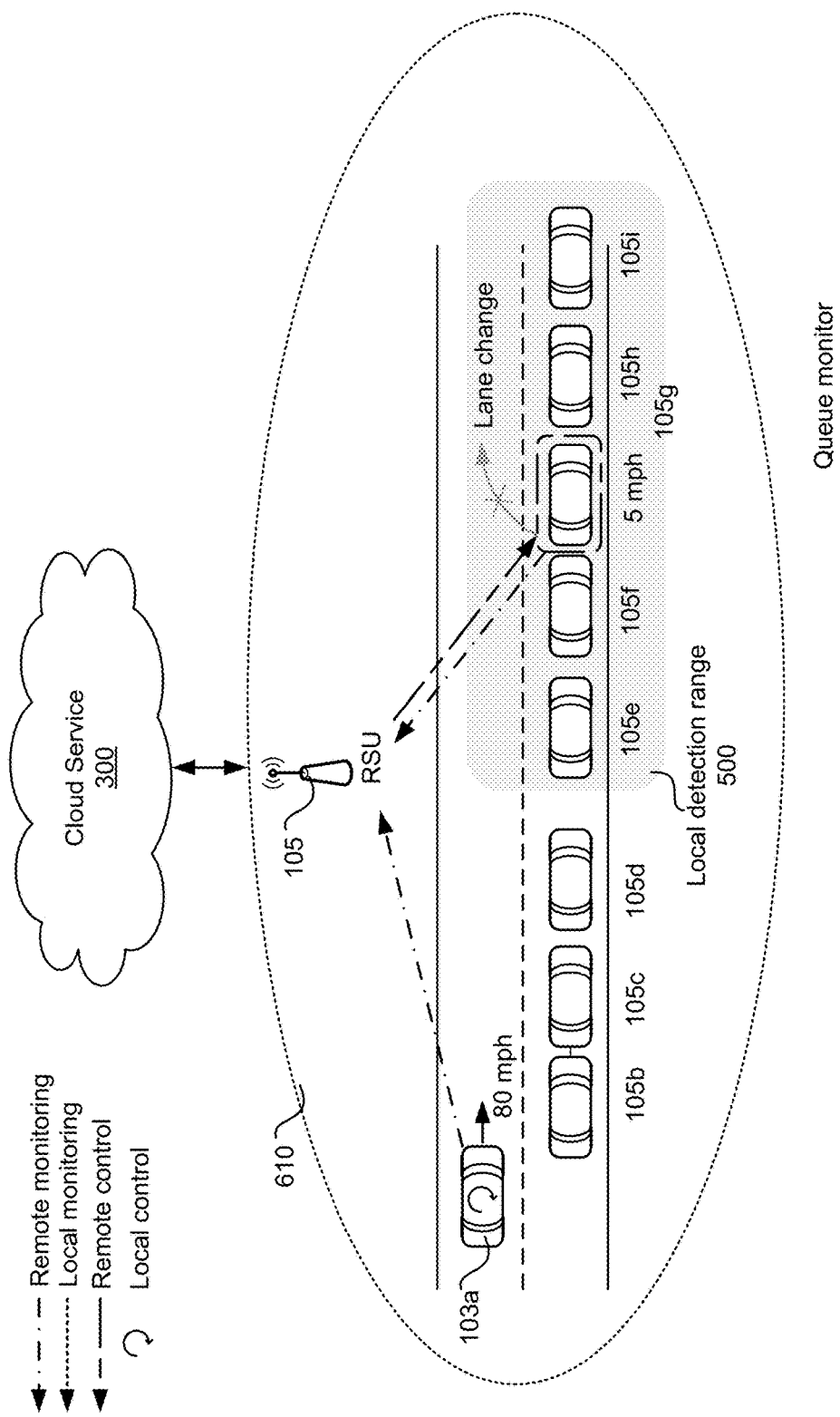
Figure 7:
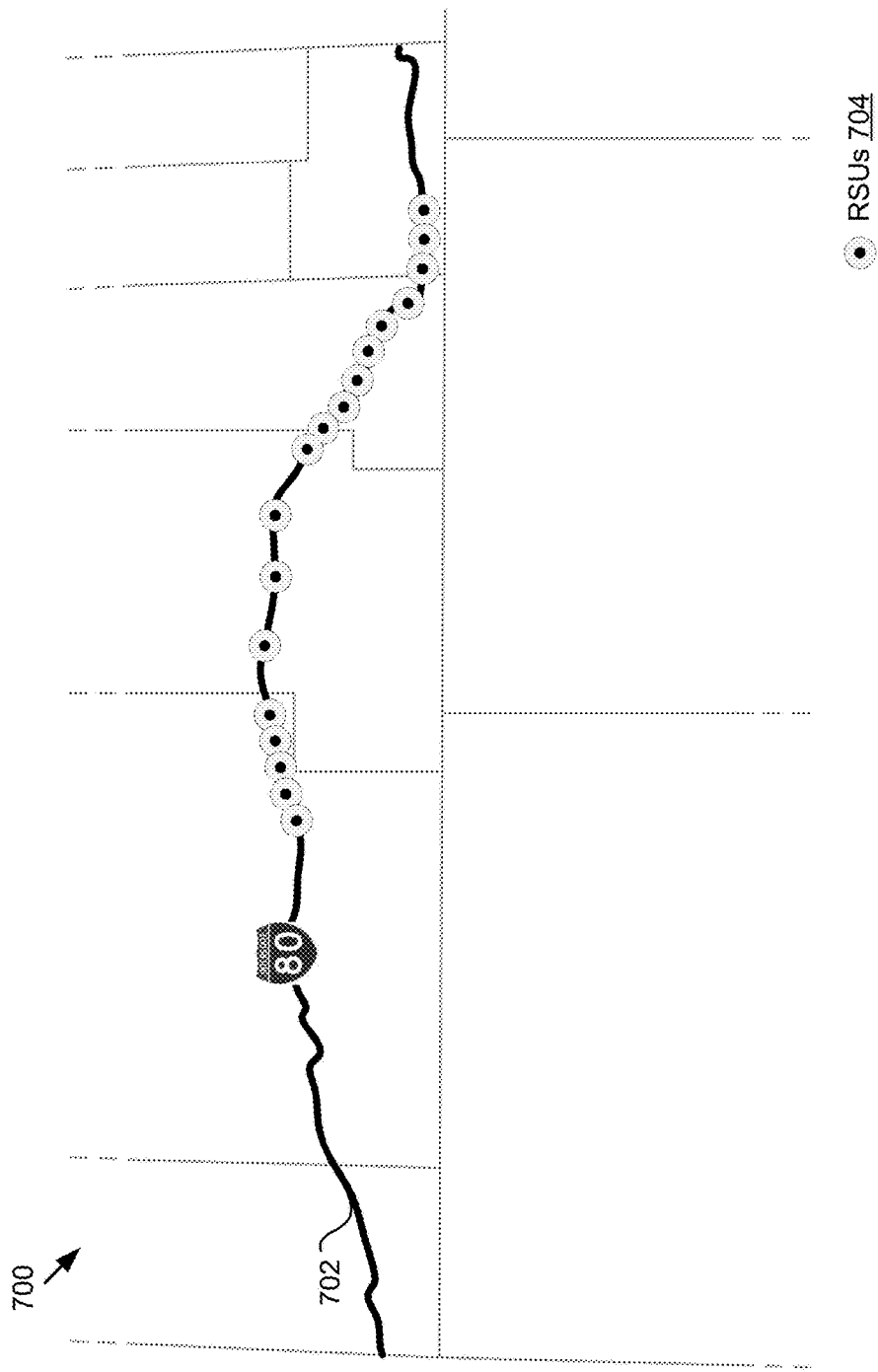
FIG. 7 depicts a map of an example roadway that includes a plurality of RSUs situated proximate a roadway.

FIGS. 5 and 6 are diagrams illustrating example selective ADAS control scenarios. FIG. 5 in particular illustrates a scenario involving RSU-based ACC in the coverage area 510. The vehicle 103a in the coverage area 510 is equipped with traditional cruise control (an ADAS of the vehicle 103a) that requires the driver to set and adjust the cruise control speed up and down. In this example, at position X, the vehicle's cruise control is set to 60 kph. The RSU 105 is capable of receiving and processing the vehicle 10a's state data and processing it relative to other dynamic data that may be monitored by the RSU 105, such as data describing the signal phase 504 of the intersection(s) signal(s) 512 and data describing the current queue 506 of vehicles 103b-m in or near the intersection 520 to determine whether to adjust any parameters of the cruise control. This effectively converts the traditional cruise control to an ACC. In these embodiments, corresponding signal and traffic sensors may be coupled to the RSU 105 to provide the monitoring data 502 and 504.

For instance, the RSU 105 is capable of calculating the appropriate speed of individual vehicle 103 to maintain a certain distance, appropriate speed to minimize braking or optimize traffic flow, etc. For instance, the RSU can instruct the vehicle 103 to lower its speed to maintain a gap from the vehicle(s) ahead of 50 m, which results in the vehicle 103 being located in position Y instead of X if it were to maintain the 60 kph rate of speed. This could also result in the vehicle coming to a stop behind the queue 506 of vehicles so as to maintain a safe distance between them, particular in a region like the one depicted in which frequent stops may be required. The RSU 105 can detect the stoppage and movement of the queue 506 based on the monitoring data (502 and 504) received and processed by the RSU, which reflects the size of the queue, geographic location of the queue, the state of the signal (e.g., green, about to turn red, red, yellow, etc.), etc. Based on the movement of the queue, or expected stopping of the queue based on the signal phase data reflecting that the light is changing from green to red (in a certain number of seconds, now, etc.).

FIG. 6 illustrates a scenario involving RSU-based automatic lane change in a coverage area 610 of the RSU 105. The vehicle 103g is equipped with a standard automatic lane change system (an ADAS of the vehicle 103g) that relies on the local sensors 113 (e.g., LIDAR, proximity sensors, etc.) of the vehicle 103g. However, these sensors 113 have a limited detection range as reflected by reference number 500. Suppose the vehicle 103g is slowed down by traffic (comprised of vehicles 105b-105i) in the right lane of the roadway (e.g., an expressway). Unknown to the sensors 133 of vehicle 105g, a vehicle 130a is approaching in the left lane at a high rate of speed (e.g., 80 mph). If the vehicle 105g's standard automatic lane change system attempts to make a lane change to the expressway, it may not detect the oncoming vehicle 103a, which could lead to a potential collision.

However, under remote ADAS control, the approaching vehicle 103a can be detected. The RSU 105 can monitor a relatively broader area (e.g., the coverage area 610) than the local detection range 500, and it may inform the vehicle of the high-speed oncoming vehicle 103a that could have not been detected with the local sensors 113. The local ADAS controller 120 can receive the instruction from the remote ADAS controller 22 and time the lane change to occur after the oncoming vehicle 103a has passed, thus increasing safety for both vehicles.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:
1. A computer-implemented method comprising:
broadcasting a first message to a vehicle entering a coverage area of an access point proximate a roadway;
receiving a response from the vehicle under local advanced drive assistance system (ADAS) control within the coverage area, the response reflecting an ADAS capability of the vehicle;
determining, based on the ADAS capability of the vehicle, whether to assume a first remote ADAS control of the vehicle by a remote ADAS controller communicating with the vehicle via the access point;
in response to determining to assume the first remote ADAS control, requesting override permission for the first remote ADAS control from a local ADAS controller of the vehicle;
receiving an override confirmation from the local ADAS controller permitting the first remote ADAS control within the coverage area of the access point; and
responsive to receiving the override confirmation, providing a first remote ADAS control instruction to the local ADAS controller of the vehicle.
2. The computer-implemented method of claim 1, further comprising:
repeatedly, while the vehicle is located in the coverage area:

receiving real-time vehicle information reflecting one or more dynamics of the vehicle;

evaluating the one or more dynamics of the vehicle relative to dynamic information of other vehicles in the coverage area to determine a subsequent remote ADAS control instruction for controlling the ADAS capability of the vehicle; and transmitting the subsequent remote ADAS control instruction via the access point to the vehicle for controlling the ADAS capability of the vehicle based on the subsequent remote ADAS control instruction.

3. The computer-implemented method of claim 1, further comprising:

determining that the vehicle is leaving the coverage area; and terminating the first remote ADAS control of the vehicle.

4. The computer-implemented method of claim 2, further comprising:

broadcasting a second message to the vehicle entering a subsequent coverage area of a subsequent access point proximate the roadway;

receiving an ADAS capability of the vehicle at the subsequent access point; and determining, based on one or more of the ADAS capability of the vehicle, computing resources of the subsequent access point, and a characteristic of a connection between the vehicle and the subsequent access point, not to assume remote ADAS control of the vehicle.

5. The computer-implemented method of claim 1, wherein determining whether to assume the first remote ADAS control of the vehicle includes:

receiving from the local ADAS controller data specifying a local driving objective for driving the vehicle in the coverage area;

determining a remote driving objective for the vehicle; and determining whether to assume the first remote ADAS control of the vehicle based on the local driving objective and the remote driving objective.

6. The computer-implemented method of claim 1, wherein providing the first remote ADAS control instruction to the local ADAS controller of the vehicle includes:

receiving real-time vehicle information describing one or more dynamics of the vehicle from the local ADAS controller of the vehicle; and generating the first remote ADAS control instruction based on the one or more dynamics of the vehicle.

7. The computer-implemented method of claim 5, wherein the real-time vehicle information describing the one or more dynamics of the vehicle includes one or more of a speed, a position, and a steering angle of the vehicle.

8. The computer-implemented method of claim 5, further comprising:

receiving, from a vehicle management cloud service, updated map data for the coverage area of the access point, wherein the first remote ADAS control instruction is further generated based on the updated map data.

9. The computer-implemented method of claim 1, wherein determining, based on the ADAS capability of the vehicle, whether to assume the first remote ADAS control of the vehicle by the remote ADAS controller communicating with the vehicle via the access point includes:

analyzing one or more signal characteristics of a data connection between the vehicle and the access point;

determining that the data connection between the vehicle and the access points is sufficient for the first remote ADAS control of the vehicle; and determining to assume the first remote ADAS control based on the determining that the data connection between the vehicle and the access point is sufficient.

10. The computer-implemented method of claim 1, wherein requesting the override permission for the first remote ADAS control from the local ADAS controller of the vehicle includes providing to the local ADAS controller a cost for the remote ADAS control, and wherein receiving the override confirmation from the local ADAS controller includes receiving an acceptance of the cost from the local ADAS controller.

11. A computer-implemented method, comprising:

receiving, at a local ADAS controller of a vehicle, a first broadcast message from an access point proximate a roadway, the first broadcast message informing the vehicle that the vehicle is present in a coverage area of the access point;

sending an ADAS profile of the vehicle to the access point, the ADAS profile specifying an ADAS capability of the vehicle;

receiving, from the access point, an override request requesting a first remote ADAS control of the vehicle by a remote ADAS controller;

providing, to the remote ADAS controller via the access point, an override confirmation providing permission to the remote ADAS controller to assume the first remote ADAS control of the vehicle; and repeatedly, while the vehicle is located in the coverage area:

determining real-time vehicle information reflecting one or more dynamics of the vehicle;

transmitting the real-time vehicle information to the access point for processing by the remote ADAS controller;

receiving a remote ADAS control instruction for controlling the ADAS capability of the vehicle; and controlling the ADAS capability of the vehicle based on the remote ADAS control instruction.

12. The computer-implemented method of claim 11, further comprising:

monitoring the presence of the vehicle in the coverage area of the access point as the vehicle drives through the coverage area;

detecting that the vehicle is leaving the coverage area of the access point; and transferring control of the ADAS capability from the remote ADAS controller to the local ADAS controller.

13. A system comprising:

one or more processors;

one or more memories storing instructions that, when executed by the one or more processors, cause the system to perform operations comprising:

broadcasting a first message to a vehicle entering a coverage area of an access point proximate a roadway;

receiving a response from the vehicle under local advanced drive assistance system (ADAS) control within the coverage area, the response reflecting an ADAS capability of the vehicle;

determining, based on the ADAS capability of the vehicle, whether to assume a first remote ADAS control of the vehicle by a remote ADAS controller communicating with the vehicle via the access point;

in response to determining to assume the first remote ADAS control, requesting override permission for the first remote ADAS control from a local ADAS controller of the vehicle;

receiving an override confirmation from the local ADAS controller permitting the first remote ADAS control within the coverage area of the access point; and responsive to receiving the override confirmation, providing a first remote ADAS control instruction to the local ADAS controller of the vehicle.

14. The system of claim 13, wherein the operations further comprise:

repeatedly, while the vehicle is located in the coverage area:
receiving real-time vehicle information reflecting one or more dynamics of the vehicle;
evaluating the one or more dynamics of the vehicle relative to dynamic information of other vehicles in the coverage area to determine a subsequent remote ADAS control instruction for controlling the ADAS capability of the vehicle; and
transmitting the subsequent remote ADAS control instruction via the access point to the vehicle for controlling the ADAS capability of the vehicle based on the subsequent remote ADAS control instruction.

15. The system of claim 13, wherein the operations further comprise:
determining that the vehicle is leaving the coverage area; and
terminating the first remote ADAS control of the vehicle.

16. The system of claim 13, wherein the operations further comprise:
broadcasting a second message to the vehicle entering a subsequent coverage area of a subsequent access point proximate the roadway;
receiving an ADAS capability of the vehicle at the subsequent access point; and
determining, based on one or more of the ADAS capability of the vehicle, computing resources of the subsequent access point, and a characteristic of a connection between the vehicle and the subsequent access point, not to assume remote ADAS control of the vehicle.

17. The system of claim 13, wherein determining whether to assume the first remote ADAS control of the vehicle includes:

receiving from the local ADAS controller specifying a local driving objective for driving the vehicle in the coverage area;
determining a remote driving objective for the vehicle; and
determining whether to assume the first remote ADAS control of the vehicle based on the local driving objective and the remote driving objective.

18. The system of claim 13, wherein providing the first remote ADAS control instruction to the local ADAS controller of the vehicle includes:
receiving real-time vehicle information describing one or more dynamics of the vehicle from the local ADAS controller of the vehicle; and
generating the first remote ADAS control instruction based on the one or more dynamics of the vehicle.

19. The system of claim 17, wherein the real-time vehicle information describing the one or more dynamics of vehicle includes one or more of a speed, a position, and a steering angle of the vehicle.

20. The system of claim 17, wherein the operations further comprise:
receiving, from a vehicle management cloud service, updated map data for the coverage area of the access point, wherein the first remote ADAS control instruction is further generated based on the updated map data.

21. The system of claim 13, wherein determining, based on the ADAS capability of the vehicle, whether to assume the first remote ADAS control of the vehicle by the remote ADAS controller communicating with the vehicle via the access point includes:
analyzing one or more signal characteristics of a data connection between the vehicle and the access point;
determining that the data connection between the vehicle and the access points is sufficient for the first remote ADAS control of the vehicle; and
determining to assume the first remote ADAS control based on the determining that the data connection between the vehicle and the access point is sufficient.

22. The system of claim 13, wherein requesting the override permission for the first remote ADAS control from the local ADAS controller of the vehicle includes providing to the local ADAS controller a cost for the remote ADAS control, and wherein receiving the override confirmation from the local ADAS controller includes receiving an acceptance of the cost from the local ADAS controller.

* * * * *